United States Patent
Kang et al.

(10) Patent No.: US 11,709,474 B2
(45) Date of Patent: Jul. 25, 2023

(54) METHOD AND APPARATUS FOR DETECTING ABNORMALITY OF MANUFACTURING FACILITY

(71) Applicant: Electronics and Telecommunications Research Institute, Daejeon (KR)

(72) Inventors: Hyun Chui Kang, Daejeon (KR); Ho Jin Park, Daejeon (KR); Ji Yeon Son, Daejeon (KR); Eun Seo Lee, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 221 days.

(21) Appl. No.: 17/136,654

(22) Filed: Dec. 29, 2020

(65) Prior Publication Data
US 2021/0240167 A1    Aug. 5, 2021

(30) Foreign Application Priority Data

Feb. 4, 2020   (KR) .................. 10-2020-0013089

(51) Int. Cl.
*G06N 20/00*      (2019.01)
*G06F 18/214*    (2023.01)
(Continued)

(52) U.S. Cl.
CPC ..... *G05B 19/4063* (2013.01); *G05B 19/4183* (2013.01); *G05B 19/4184* (2013.01);
(Continued)

(58) Field of Classification Search
CPC ............ G05B 19/4185; G05B 19/4183; G05B 19/4184; G05B 19/41865; G05B 23/024;
(Continued)

(56) References Cited

U.S. PATENT DOCUMENTS 8,356,207 B2   1/2013  Hosek et al.
8,824,345 B2   9/2014  Kim et al.
(Continued)

FOREIGN PATENT DOCUMENTS

| KR | 20-0306169 | 3/2003 |
| KR | 10-1560968 | 10/2015 |
| KR | 10-2018-0120558 | 11/2018 |

OTHER PUBLICATIONS

Progress DataRPM, "Anomaly Detection & Prediction Decoded: 6 Industries, Copious Challenges, Extraordinary Impact", Progress Software Corporation, 2017, https://www.progress.com/search?q=anomaly_detection_in_6.
(Continued)

*Primary Examiner* — Walter L Lindsay, Jr.
*Assistant Examiner* — Geoffrey T Evans
(74) *Attorney, Agent, or Firm* — Kile Park Reed & Houtteman PLLC (57) ABSTRACT

A method and apparatus for detecting an abnormality of a manufacturing facility is disclosed. According to an example embodiment of the present disclosure, a learning model generating method for manufacturing facility abnormality detection may include receiving a measured value for a normal state of a manufacturing facility collected through a multi-sensor on a time-by-time basis, generating a learning model including a predetermined weight set and training the learning model using the measured value, and determining, using the learning model, a threshold corresponding to a boundary between the normal state and an abnormal state of the manufacturing facility and a criterion for determining the abnormal state in a local window representing a predetermined time interval.

13 Claims, 7 Drawing Sheets

(51) Int. Cl.
*G05B 19/4063* (2006.01)
*G05B 19/418* (2006.01)

(52) U.S. Cl.
CPC ... *G05B 19/4185* (2013.01); *G05B 19/41865* (2013.01); *G06F 18/214* (2023.01); *G06N 20/00* (2019.01)

(58) Field of Classification Search
CPC ............ G05B 19/4063; G05B 23/0243; G05B 23/0272; G06K 9/6256; G06K 9/6271; G06N 20/00; G06N 3/0445; G06N 3/0454; G06N 3/08; Y02P 90/02; B25J 9/1674
See application file for complete search history.

(56) References Cited

U.S. PATENT DOCUMENTS

2017/0262011 A1 9/2017 Kwon et al.
2019/0354080 A1* 11/2019 Yoshida ............. G05B 19/4063

OTHER PUBLICATIONS

Varun Chandola et al., "Anomaly Detection: A Survey", ACM Computing Surveys (CSUR), Jul. 2009, pp. 1-72.
Varun Chandola et al., "Outlier Detection: A Survey", University of Minnesota, pp. 1-83.
Manish Gupta et al., "Outlier Detection for Temporal Data: A Survey", IEEE Transactions on Knowledge and Data Engineering, Sep. 2014, pp. 2250-2267, vol. 26, No. 9.
Nitish Srivastava et al., "Unsupervised Learning of Video Representations using LSTMs", Proceedings of the 32nd International Conference on Machine Learning, 2015, JMLR: W&CP vol. 37.
Ravishankar Rao Vallabhajosyula et al., "Anomaly Detection: Real World Scenarios, Approaches and Live Implementation", Impetus StreamAnalytix, Dec. 15, 2017.

* cited by examiner

METHOD AND APPARATUS FOR DETECTING ABNORMALITY OF MANUFACTURING FACILITY

CROSS-REFERENCE TO RELATED APPLICATION(S)

This application claims the benefit of Korean Patent Application No. 10-2020-0013089, filed on Feb. 4, 2020, in the Korean Intellectual Property Office, the disclosure of which is incorporated herein by reference.

BACKGROUND

1. Field of the Invention

The present disclosure relates to a method and apparatus for detecting an abnormality of a manufacturing facility, and more particularly, to a method and apparatus for generating a long short-term memory (LSTM) autoencoder-applied learning model and detecting an abnormality of a manufacturing facility using the learning model.

2. Description of the Related Art

Recently, with industrial developments, a trend of producing a variety of products in small quantities is spreading. Various manufacturing facilities are required to produce products in such trend. As the manufacturing facilities are diversified, a lot of time and effort may be taken to determine whether functions included in the manufacturing facilities operate abnormally.

In related arts, a factory manager detects an abnormality through monitoring in real time and directly determines a presence or absence of a functional abnormality, which may cause not only manpower and cost problems but also objectivity and accuracy problems in determining the presence or absence of the abnormality. Accordingly, there is a desire for technology for detecting and determining whether the entire manufacturing facility of the factory has an abnormality.

SUMMARY

An aspect provides a method and apparatus for reducing costs for replacing a manufacturing facility in a factory to detect a manufacturing facility abnormality by receiving an abnormal state of the manufacturing facility from a multi-sensor attached to the manufacturing facility without replacing the manufacturing facility.

Another aspect also provides a method and apparatus for responding immediately to abnormal detection and increasing an accuracy of detecting an abnormality of a manufacturing facility using a learning model to which a long short-term memory (LSTM) and an autoencoder are applied.

According to an aspect, there is provided a learning model generating method for detecting an abnormality of a manufacturing facility, the method including receiving a measured value for a normal state of a manufacturing facility collected through a multi-sensor on a time-by-time basis, generating a learning model including a predetermined weight set and training the learning model using the measured value, and determining, using the learning model, a threshold corresponding to a boundary between the normal state and an abnormal state of the manufacturing facility and a criterion for determining the abnormal state in a local window representing a predetermined time interval.

The learning model generating method may further include removing a direction component of the received measured value to use the measured value for training of the learning model.

The training of the learning model may include calculating a measured value of a predetermined time t along with a weight set of the learning model and training the learning model by applying a portion of a result of the calculating to a calculation of the weight set and a measured value at t+1.

The training of the learning model may include updating the weight set such that an output value through the learning model is a same as the measured value.

According to another aspect, there is also provided a method of detecting an abnormality of a manufacturing facility, the method including receiving a measured value for a current state of a manufacturing facility measured through a multi-sensor on a time-by-time basis, acquiring an output value for each time by inputting the measured value to a learning model for manufacturing facility abnormality detection, determining whether a proportion of an output value exceeding a threshold of the learning model satisfies a determination criterion of the learning model by comparing the output values to the threshold during a local window of the learning model, and determining that the manufacturing facility is abnormal when the determination criterion is not satisfied.

The determining of whether the proportion satisfies the determination criterion may include determining whether the determination criterion of the learning model is satisfied based on a relationship between output values exceeding the threshold during the local window of the learning model.

The method may further include switching, when the manufacturing facility is determined to be abnormal, a control mode of the manufacturing facility to a server control mode controlled by a server or an Internet of things (IoT) terminal control mode controlled by an IoT terminal that performs a manufacturing facility abnormal detection method, based on predetermined control mode setting information.

The method may further include determining, when the manufacturing facility is determined to be abnormal, a cause of an occurrence of an abnormality in the manufacturing facility through a comparison between the measured value and the threshold and recording information on the cause.

The method may further include reporting a current state of the manufacturing facility to an operator of the manufacturing facility when the manufacturing facility is determined to be abnormal.

The method may further include evaluating an accuracy of the learning model and updating a weight set of the learning model when the manufacturing facility is determined to be abnormal.

According to another aspect, there is also provided a learning model generating apparatus for detecting an abnormality of a manufacturing facility, the apparatus including a processor, wherein the processor is configured to receive a measured value for a normal state of a manufacturing facility collected through a multi-sensor on a time-by-time basis, generate a learning model including a predetermined weight set, train the learning model using the measured value, and determine, using the learning model, a threshold corresponding to a boundary between the normal state and an abnormal state of the manufacturing facility and a criterion for determining the abnormal state in a local window representing a predetermined time interval.

The processor may be configured to remove a direction component of the received measured value to use the measured value for training of the learning model.

The processor may be configured to calculate a measured value of a predetermined time t along with a weight set of the learning model and train the learning model by applying a portion of a result of the calculating to a calculation of the weight set and a measured value at t+1.

The processor may be configured to update the weight set such that an output value through the learning model is a same as the measured value.

According to another aspect, there is also provided a manufacturing facility abnormality detection apparatus including a processor, wherein the processor is configured to receive a measured value for a current state of a manufacturing facility measured through a multi-sensor on a time-by-time basis, acquire an output value for each time by inputting the measured value to a learning model for manufacturing facility abnormality detection, determine whether a proportion of an output value exceeding a threshold of the learning model satisfies a determination criterion of the learning model by comparing the output values to the threshold during a local window of the learning model, and determine that the manufacturing facility is abnormal when the determination criterion is not satisfied.

The processor may be configured to determine whether the determination criterion of the learning model is satisfied based on a relationship between output values exceeding the threshold during the local window of the learning model.

When the manufacturing facility is determined to be abnormal, the processor may be configured to switch a control mode of the manufacturing facility to a server control mode controlled by a server or an IoT terminal control mode controlled by an IoT terminal that performs a manufacturing facility abnormal detection method, based on predetermined control mode setting information.

When the manufacturing facility is determined to be abnormal, the processor may be configured to determine a cause of an occurrence of an abnormality in the manufacturing facility through a comparison between the measured value and the threshold and record information on the cause.

Wherein when the manufacturing facility is determined to be abnormal, the processor may be configured to report a current state of the manufacturing facility to an operator of the manufacturing facility.

When the manufacturing facility is determined to be abnormal, the processor may be configured to evaluate an accuracy of the learning model and update a weight set of the learning model Additional aspects of example embodiments will be set forth in part in the description which follows and, in part, will be apparent from the description, or may be learned by practice of the disclosure.

BRIEF DESCRIPTION OF THE DRAWINGS

These and/or other aspects, features, and advantages of the invention will become apparent and more readily appreciated from the following description of example embodiments, taken in conjunction with the accompanying drawings of which.

DETAILED DESCRIPTION

Hereinafter, example embodiments will be described in detail with reference to the accompanying drawings. It should be understood, however, that there is no intent to limit this disclosure to the particular example embodiments disclosed. On the contrary, example embodiments are to cover all modifications, equivalents, and alternatives falling within the scope of the example embodiments.

The terminology used herein is for the purpose of describing particular embodiments only and is not intended to be limiting. As used herein, the singular forms "a," "an," and "the," are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms, including technical and scientific terms, used herein have the same meaning as commonly understood by one of ordinary skill in the art to which this disclosure pertains. Terms, such as those defined in commonly used dictionaries, are to be interpreted as having a meaning that is consistent with their meaning in the context of the relevant art, and are not to be interpreted in an idealized or overly formal sense unless expressly so defined herein.

Regarding the reference numerals assigned to the elements in the drawings, it should be noted that the same elements will be designated by the same reference numerals, wherever possible, even though they are shown in different drawings. Also, in the description of embodiments, detailed description of well-known related structures or functions will be omitted when it is deemed that such description will cause ambiguous interpretation of the present disclosure.

Figure 1A:
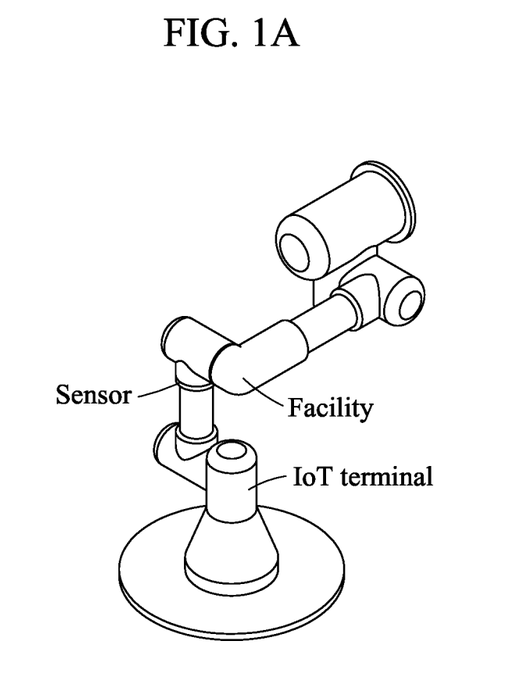
FIGS. 1A and 1B are diagrams illustrating a relationship of a manufacturing facility, a sensor, and an Internet of things (IoT) terminal according to an example embodiment of the present disclosure.
Figure 1B:
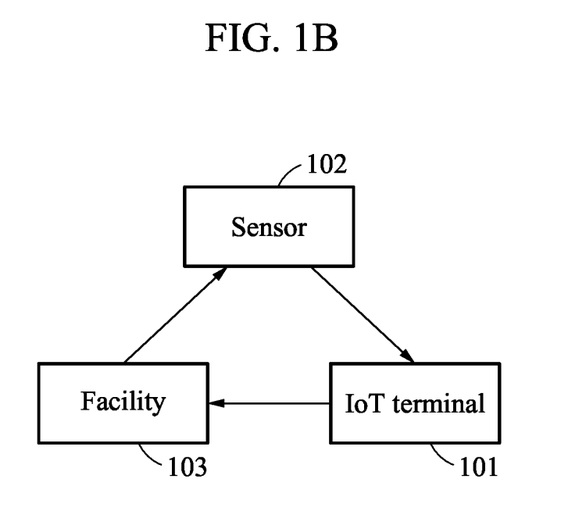

FIGS. 1A and 1B are diagrams illustrating a relationship of a manufacturing facility, a sensor, and an Internet of things (IoT) terminal according to an example embodiment of the present disclosure.

Referring to FIGS. 1A and 1B, an apparatus for detecting an abnormality of a manufacturing facility 103 may include the manufacturing facility 103 used for a smart factory, a multi-sensor 102 attached to or separate from the manufacturing facility 103, and an IoT terminal 101. The IoT terminal 101 may include a processor that performs a method of detecting an abnormality of the manufacturing facility 103 and a learning model generating method of the present disclosure.

Referring to FIG. 1A, the multi-sensor 102 and the IoT terminal 101 may be attached to the manufacturing facility 103. The manufacturing facility 103 may be one of various types of equipment such as a robot arm, a three-dimensional (3D) printer, a drill, a cutting machine, a welding machine, a carrier, a heater, an absorber, a computer numerical control (CNC), and the like, based a process in the smart factory.

The multi-sensor 102 may be a device for measuring a value regarding an operation (e.g., vibration, rotation, lifting, lowering, extension, reduction, etc.) related to the specific function of the manufacturing facility 103 and an ambient environment (e.g., humidity, temperature, etc.) that may affect the operation related to the specific function of the manufacturing facility 103. The multi-sensor 102 may be embedded in or attached to the IoT terminal 101 or the manufacturing facility 103. In some cases, the multi-sensor 102 may be installed separate from the manufacturing facility 103. Referring to FIG. 1B, the multi-sensor 102 may collect a value (hereinafter, referred to as a "measured value") regarding the operation of the manufacturing facility 103 and transmit the collected value to the IoT terminal 101 on a time-by-time basis.

The IoT terminal 101 may generate a long short-term memory (LSTM) autoencoder-applied learning model for each function of the manufacturing facility 103. The IoT terminal 101 may train the learning model using the measured value received from the multi-sensor 102. The IoT terminal 101 may determine whether the manufacturing facility 103 is abnormal based on the measured value and the trained learning model in real time. When the IoT terminal 101 determines that the manufacturing facility 103 is abnormal, a determination result may be reported to an operator of the manufacturing facility 103 and a control signal may be transmitted to the manufacturing facility 103, so that the manufacturing facility 103 is controlled directly or controlled by a server of a factory.

The IoT terminal 101 may be one of various devices capable of wirelessly communicating with the manufacturing facility 103 or the server of the factory, such as a mobile phone, a laptop computer, a desktop computer, a tablet PC, a PDA, a smart band, smart goggles, and the like.

Figure 2:
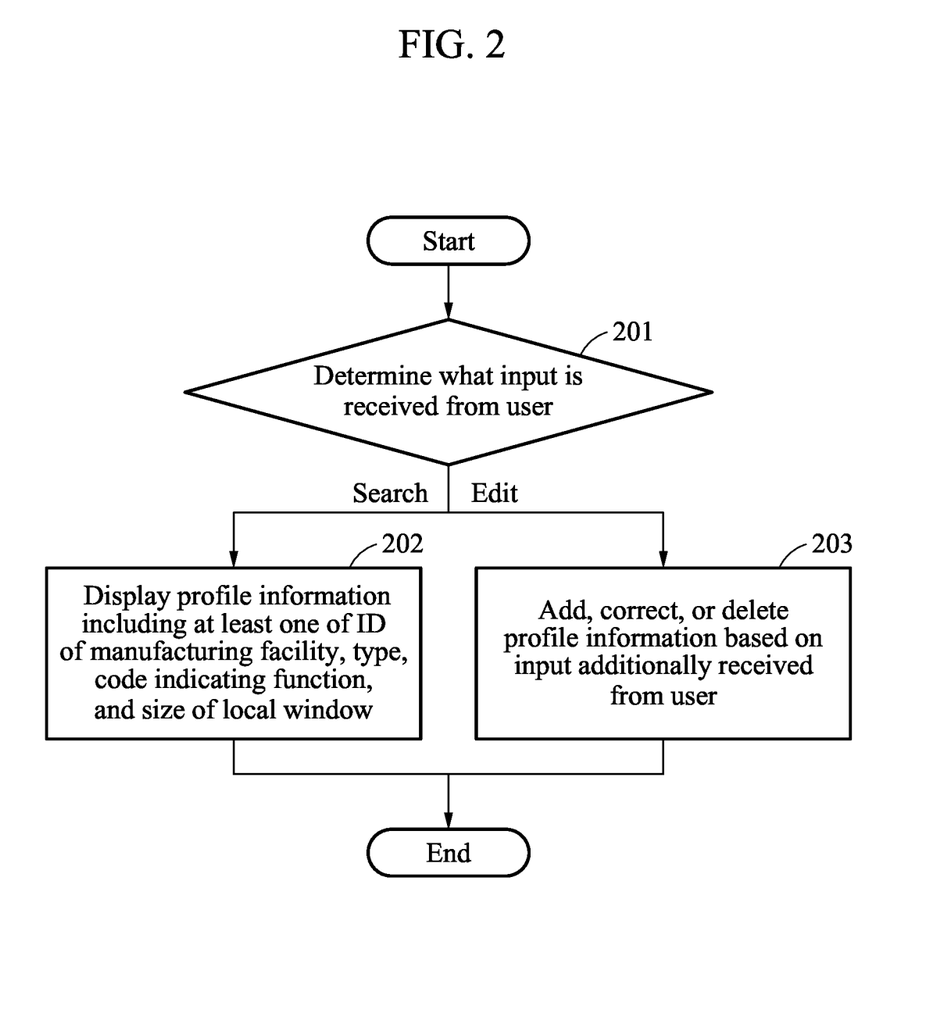
FIG. 2 is a flowchart illustrating a method of searching for or editing information on a manufacturing facility according to an example embodiment of the present disclosure.

FIG. 2 is a flowchart illustrating a method of searching for or editing information on a manufacturing facility according to an example embodiment of the present disclosure.

Referring to FIG. 2, an IoT terminal may receive an input for searching for or editing profile information of a manufacturing facility from a user. The profile information of the manufacturing facility may be stored in an extensible markup language XML) scheme or as a database. The profile information of the manufacturing facility may include at least one of an identification (ID) of the manufacturing facility, a type of the manufacturing facility, a code for each function of the manufacturing facility, and a size of a local window indicating a predetermined time interval.

In operation 201, the IoT terminal may determine what input is received from the user. In operation 202, when a received user command is a search command, the IoT terminal may display profile information including at least one of an ID of the manufacturing facility, a type of the manufacturing facility, a code for each function of the manufacturing facility, a size of a local window indicating a predetermined time interval, and a threshold. In operation 203, when a received user command is an edit command, the IoT terminal may add, correct, or delete the profile information based on an input additionally received from the user.

In this example, a threshold used to determine whether the manufacturing facility has an abnormality may be set or corrected through the edit command of the profile information. The threshold may be a value corresponding to a boundary between a normal state and an abnormal state of the manufacturing facility.

Figure 3:
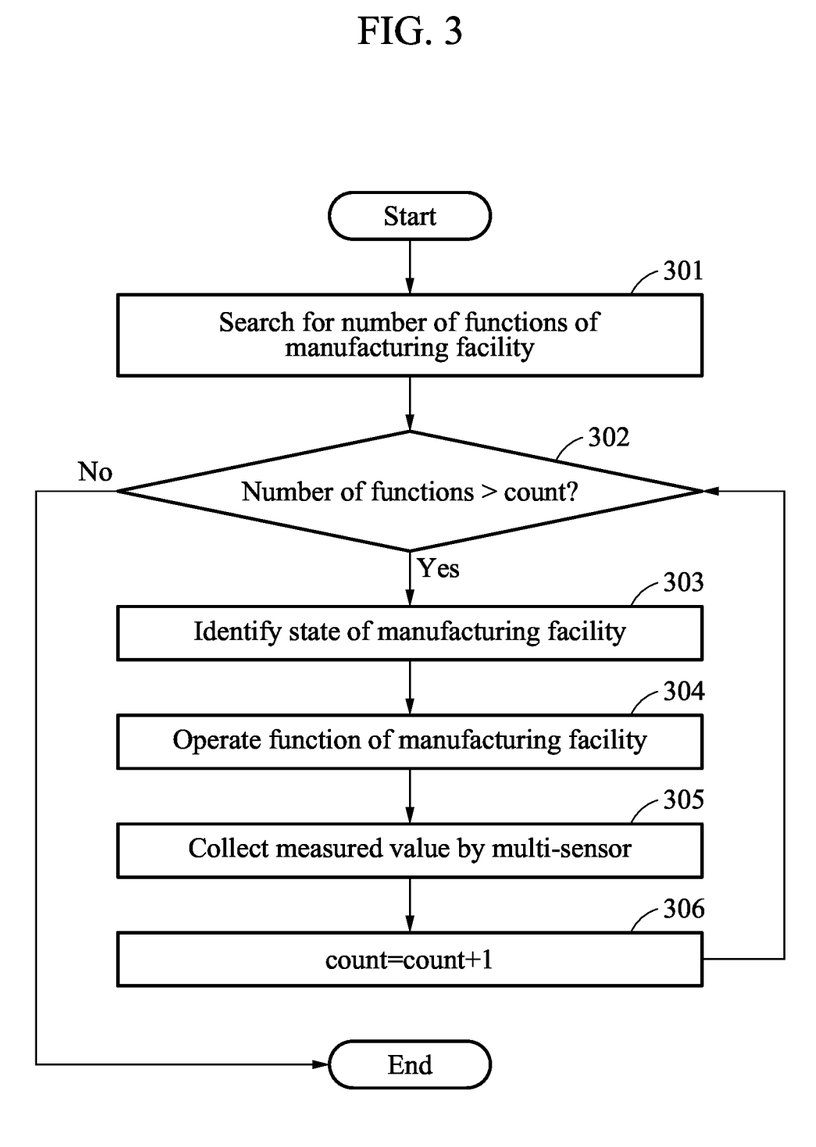
FIG. 3 is a flowchart illustrating a method of collecting information through a multi-sensor when a function of a manufacturing facility is executed according to an example embodiment of the present disclosure.

FIG. 3 is a flowchart illustrating a method of collecting a measured value through a multi-sensor when a function of a manufacturing facility is executed according to an example embodiment of the present disclosure.

In operation 301, an IoT terminal attached to the manufacturing facility may search for the number of functions of the manufacturing facility. Thereafter, a multi-sensor may collect a measured value from an operation related to all functions of the manufacturing facility. In this example, the IoT terminal may receive a measured value collected from the multi-sensor on a time-by-time basis.

Referring to FIG. 3, in operation 302, the IoT terminal may use a count set to zero. The IoT terminal may compare the count and the found number of functions in operation 302. Operations 303 through 306 may be repetitively performed until the number of functions is less than the count. That is, operations 303 through 306 may be repeated a number of times corresponding to the number of functions.

In operation 303, the IoT terminal may identify a state of the manufacturing facility. In this example, the IoT terminal may identify a code of a function for which the manufacturing facility is operating. In operation 304, a specific function of the manufacturing facility may operate. In operation 305, the multi-sensor may collect a measured value of an operation of the specific function and transmit the measured value to the IoT terminal.

In operation 306, the IoT terminal may receive the measured value collected by the multi-sensor until the operation of the specific function terminates. Thereafter, the IoT terminal may increase the count and perform operation 302 again, so that a measured value corresponding to a subsequent function of the manufacturing facility is received.

Figure 4:
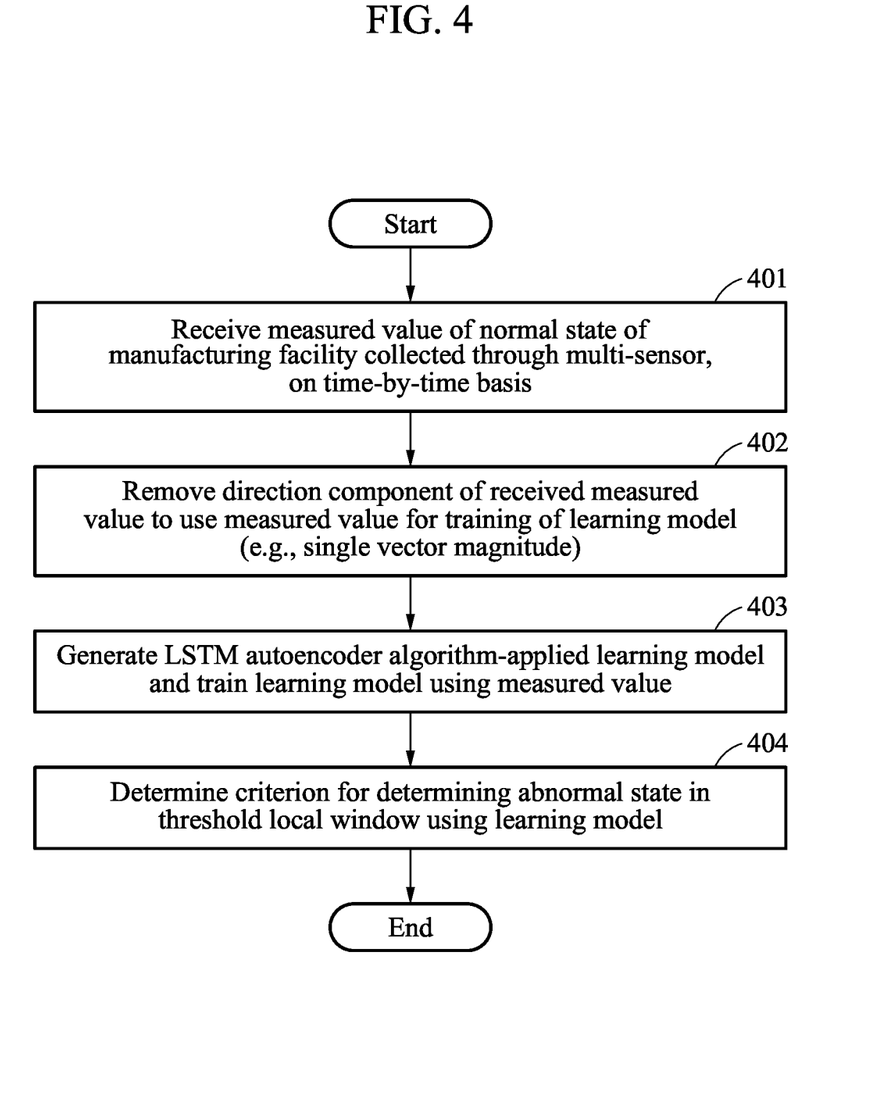
FIG. 4 is a flowchart illustrating a learning model generating method according to an example embodiment of the present disclosure.

FIG. 4 is a flowchart illustrating a learning model generating method according to an example embodiment of the present disclosure.

In operation 401, an IoT terminal may receive a measured value of a normal state of a manufacturing facility collected through the multi-sensor, on a time-by-time basis. The multi-sensor may collect a measured value measured when each of the functions of the manufacturing facility operates normally.

In this example, as described with reference to FIG. 3, the multi-sensor may continue to collect until a measured value of the normal state of all functions of the manufacturing facility is collected. The IoT terminal may receive the collected measured value in real time. The normal state of the manufacturing facility may refer to a state in which the functions of the manufacturing facility operate without abnormalities.

In operation 402, the IoT terminal may perform a pre-processing process of the received measured value to use the measured value for training of a learning model. Here, the measured value may include a direction component for a movement of the manufacturing facility. The IoT terminal may remove the direction component of the measured value and convert into an absolute value. For example, the IoT terminal may use Equation 1 to remove the direction component of the measured value using a single vector magnitude (SVM).

$$SVM(a) = \sqrt{x^2 + y^2 + z^2}$$ [Equation 1]

In Equation 1, x, y, and z may be direction components that the measurement value has with respect to an X axis, an Y axis, and a Z axis of the manufacturing facility. SVM(a) obtained using Equation 1 may be the measured value corresponding to the normal state of the manufacturing facility for a predetermined time t. Since the measured value is collected and transmitted for each time, the IoT terminal may continuously calculate an average of consecutive measured values to be used for the training of the learning model.

In operation 403, the IoT terminal may generate a learning model including a predetermined weight set and train the learning model using the measured value. The IoT terminal may generate a learning model to which an LSTM and an autoencoder are applied for each function of the manufacturing facility.

Specifically, the IoT terminal may sequentially input the measured value to the learning model according to the LSTM. The input measured value may be calculated along with the weight set included in the learning model. In this example, the IoT terminal may calculate the measured value of the predetermined time t along with the weight set of the learning model and use a portion of a result of the calculating for calculation of a measured value and a weight set at t+1.

Also, the learning model generating apparatus 101 may train the learning model by updating the weight set such that an output of a learning model 104 is the same as a measured value input based on an autoencoder scheme. For example, the IoT terminal may update a weight set such that a reconstruction error indicating a difference between a measured value and an output value of a learning model is minimized.

Specifically, a root mean square error (RMSE) may be used to obtain the reconstruction error. In the present disclosure, the RMSE may be determined as a root of a value obtained by squaring and averaging the error between the measured value and the output value of the learning model.

In operation 404, the IoT terminal may train the learning model 104 on the normal state of the manufacturing facility, and then determine a threshold corresponding to a boundary between the normal state and the abnormal state of the manufacturing facility. That is, whether the output value output through the learning model exceeds the threshold may be used for determining whether the manufacturing facility is abnormal.

Also, in operation 404, the IoT terminal may determine a criterion for determining the abnormal state in a local window indicating a predetermined time interval. The criterion may be a proportion of an output value exceeding the threshold among output values of the learning model during the local window.

For example, the criterion for determining the abnormal state may be set to 20%. In this example, the IoT terminal may determine that the manufacturing facility is abnormal when three output values exceed the threshold among ten output values of the learning model during the local window. The criterion may be determined through an edit of the profile information of the manufacturing facility or determined by the IoT terminal through the learning model.

The learning model generating apparatus may train the learning model using a learning method such as k-nearest neighbors (KNN), Naive Bayesian classification, support vector machine (SVM), and the like in addition to the LSTM and the autoencoder. The IoT terminal may use a learning model according to various learning methods so that an optimal learning method is selected based on a characteristic of the manufacturing facility.

Figure 5:
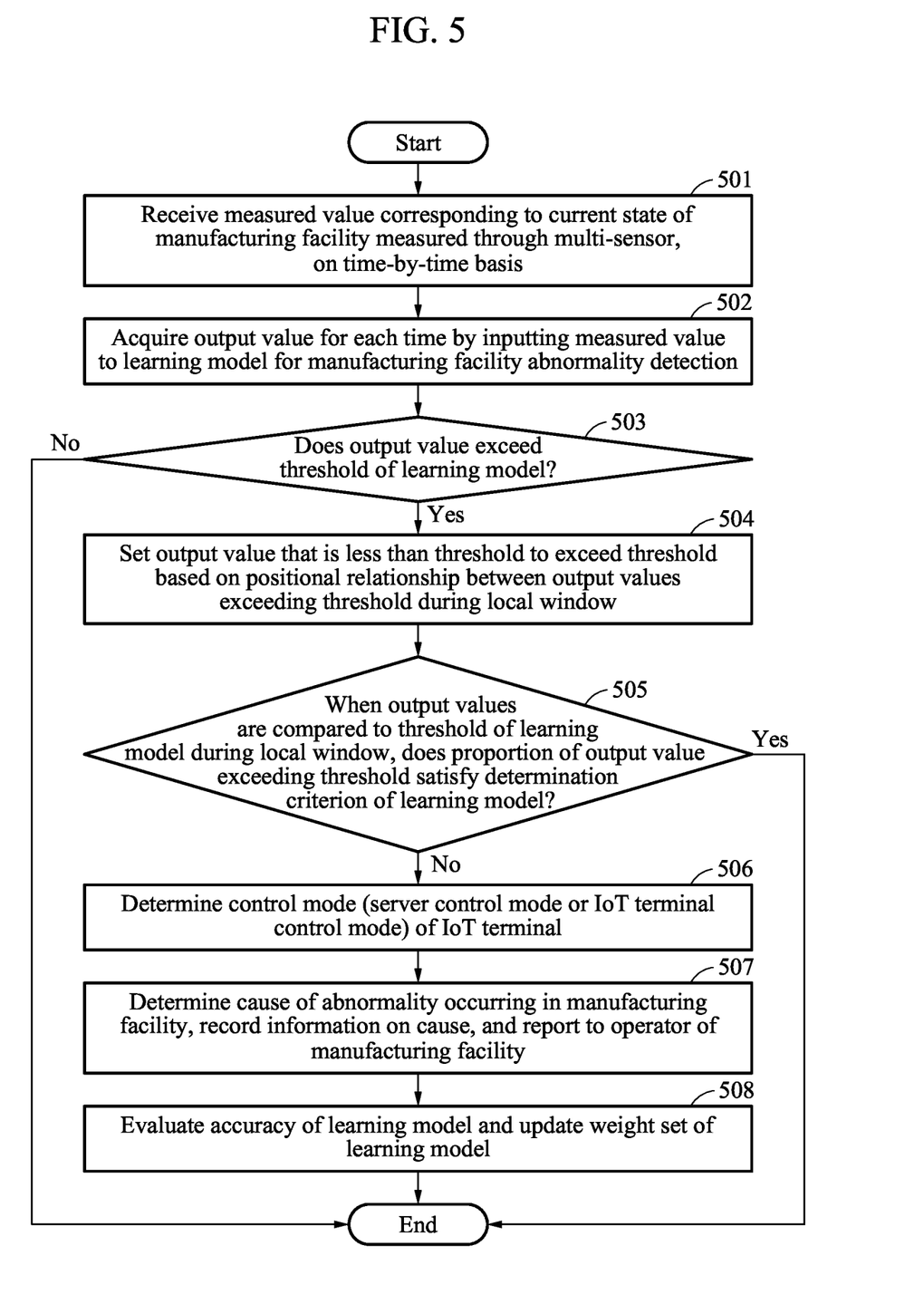
FIG. 5 is a flowchart illustrating a method of detecting an abnormality of a manufacturing facility according to an example embodiment of the present disclosure.

FIG. 5 is a flowchart illustrating a method of detecting an abnormality of a manufacturing facility according to an example embodiment of the present disclosure.

In operation 501, an IoT terminal may receive a measured value corresponding to a current state of a manufacturing facility measured through a multi-sensor, on a time-by-time basis. That is, the IoT terminal may consecutively receive measured value through the multi-sensor to detect an abnormality of the manufacturing facility in real time.

In operation 502, the IoT terminal may acquire an output value for each time by inputting the measured value to a learning model for manufacturing facility abnormality detection. Here, the learning model may be a learning model trained using a measured value corresponding to a normal state in advance.

Since a weight set of the learning model is determined in advance, the IoT terminal may acquire an output value by calculating the measured value and the weight set of the learning model. The calculation of the measured value and the weight set may be performed using the same method as the learning model generating method.

In operation 503, the IoT terminal may compare output values to a threshold of the learning model during a local window of the learning model. When an output value exceeds the threshold, a specific function of the manufacturing facility may be in an abnormal state. When the output value exceeding the threshold is absent, the manufacturing facility may operate normally. In this case, a subsequent operation may not be performed. In contrast, when an output value exceeds the threshold, operations 504 to 508 may be performed.

In operation 504, the IoT terminal may identify output values exceeding the threshold during a period of time included in the local window indicating a predetermined time interval. The IoT terminal may determine whether a determination criterion of the learning model is satisfied based on a relationship between the output values exceeding the threshold during the local window.

Specifically, when an output value of a previous time t−1 or t−2 or a subsequent time t+1 exceeds the threshold even though an output value of a predetermined time t does not exceed the threshold, the IoT terminal may set the output value of the predetermined time t to exceed the threshold. As such, changing a comparison result between an output value and a threshold may be defined as a state transition. The state transition will be described in detail with reference to FIG. 7.

In operation 505, the IoT terminal may determine whether a proportion of the output values exceeding the threshold satisfies the determination criterion of the learning model. Specifically, when the output values exceeding the threshold among output values output during a period of time included in the local window indicating a predetermined time interval are greater than the determination criterion, the IoT terminal may determine that the manufacturing facility is abnormal.

For example, the determination criterion may be determined as 10% or less. In this example, when two output values exceed the threshold among ten temporally consecutive output values, since the determination criterion is not satisfied, the IoT terminal may determine that the manufacturing facility is abnormal. When it is determined that the manufacturing facility is abnormal, operations 506 to 508 may be performed.

In operation 506, the IoT terminal may switch a control mode of the manufacturing facility to a server control mode controlled by a server or an IoT terminal control mode controlled by the IoT terminal that performs a manufacturing facility abnormal detection method, based on predetermined control mode setting information.

In the server control mode, an operator of the manufacturing facility may transmit a control command to an IoT terminal attached to each manufacturing facility through the server. The IoT terminal may transmit the received control command to the manufacturing facility to process an abnormality of the manufacturing facility. In the IoT terminal control mode, the IoT terminal may transmit a control command corresponding to a state of the manufacturing facility to the manufacturing facility to process an abnormality of the manufacturing facility.

In operation 507, the IoT terminal may determine a cause of the abnormality occurring in the manufacturing facility by comparing the measured value and the threshold, record information on the cause, and report a current state of the manufacturing facility to the operator of the manufacturing facility. In operation 508, the IoT terminal may evaluate an accuracy of the learning model and update the weight set of the learning model.

Figure 6:
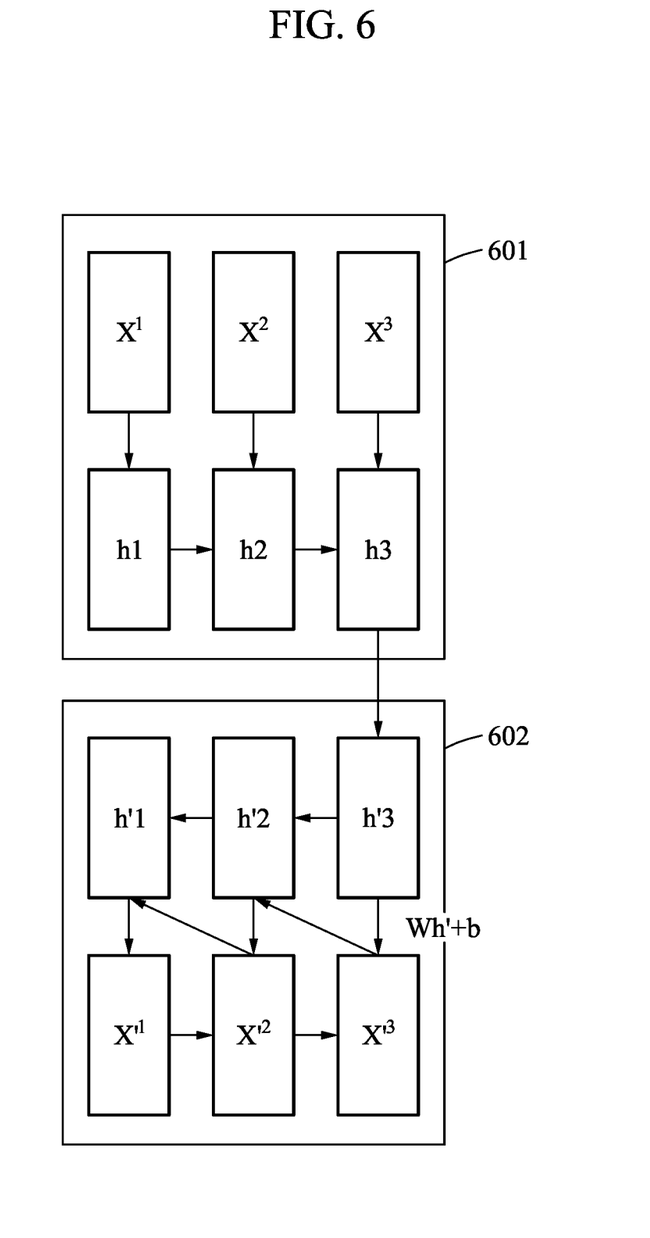
FIG. 6 is a diagram illustrating a data processing process through a long short-term memory (LSTM) and an autoencoder according to an example embodiment of the present disclosure.

FIG. 6 is a diagram illustrating a data processing process through an LSTM and an autoencoder according to an example embodiment of the present disclosure.

FIG. 6 is a diagram illustrating a process of processing a measured value through a learning model to which an LSTM and an autoencoder are applied. x1, x2, and x3 denote temporally consecutive measured values used for training of a learning model. x'1, x'2, and x'3 denote output values of the learning model. h1, h2, h3, h'1, h'2, and h'3 denote weight sets of the learning model.

According to the LSTM, in an encoder 601, h2 may include a portion of a calculation result of x1 and h1. Also, in the encoder 601, h3 may include a portion of a calculation result of x2 and h2. Accordingly, like x1, since an initial input may also affect a calculation of h3 and x3, a relationship of x1-x3 may be reflected.

In a decoder 302, x'1, x'2, and x'3 may be output through h'1, h'2, h'3, and W that is one of weights. For example, to extract x'3, the IoT terminal may extract x'3 using the weight W and h'3 determined based on x3 and h3 as shown in FIG. 6. In FIG. 6, b denotes bias. According to the autoencoder, the IoT terminal may update the weight W such that x1, x2, and x3 are the same as x'1, x'2, and x'3.

Figure 7:
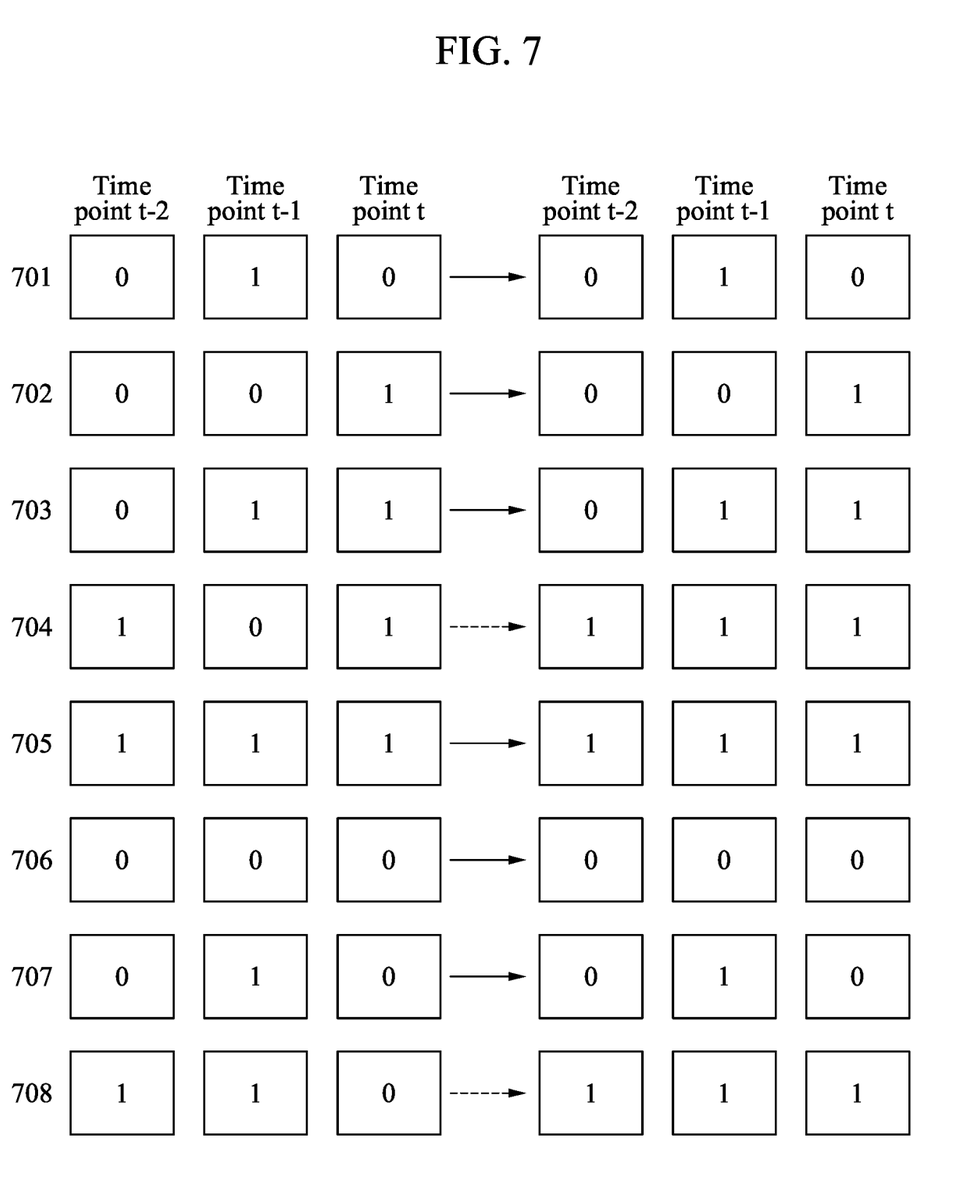
FIG. 7 is a diagram illustrating a process of determining whether a determination criterion of a learning model is satisfied based on a relationship between output values exceeding a threshold during a local window according to an example embodiment of the present disclosure.

FIG. 7 is a diagram illustrating a process of determining whether a determination criterion of a learning model is satisfied based on a relationship between output values exceeding a threshold during a local window according to an example embodiment of the present disclosure.

In an apparatus for detecting an abnormality of a manufacturing facility, for accurate abnormality detection, a state transition may occur by the IoT terminal during a local window. Here, as defined above, the state transition may indicate that an output value of a predetermined time point is set to exceed a threshold when an output value of a neighboring time point exceeds the threshold even though the output value of the predetermined time point does not exceed the threshold.

Also, when an output value of that time point exceeds the threshold (anomaly), an individual window corresponding to each time point may be displayed as 1. Otherwise (normal), an individual window corresponding to each time point may be displayed as zero. When three consecutive individual windows are provided, the number of cases may be eight as shown in FIG. 7.

Each quadrangle of FIG. 7 represents an individual window included in a local window and indicating whether an output value of a predetermined time point exceeds a threshold. In a case of 701 of FIG. 7, output values do not exceed the threshold at t and t−2. Thus, even though an output value exceeds the threshold at t−1, the state transition does not occur. Also, in cases of 702-703 and 705-707, the state transition does not occur.

However, in a case of 704 of FIG. 7, output values exceed the threshold at t and t−2. Thus, even though an output value does not exceed the threshold at t−1, the state transition occurs because a state of the manufacturing facility is likely to be abnormal at t−1. That is, as shown in FIG. 7, an individual window corresponding to t−1 is changed to a case in which an output value exceeds the threshold. Also, in a case of 708 of FIG. 7, output values exceed the threshold at t−2 and t−1. Thus, even though an output value does not exceed the threshold at t, the state transition occurs.

According to example embodiments, it is possible to reduce costs for replacing a manufacturing facility in a factory to detect a manufacturing facility abnormality by receiving an abnormal state of the manufacturing facility from a multi-sensor attached to the manufacturing facility without replacing the manufacturing facility.

Further, according to example embodiments, it is possible to respond immediately to abnormal detection and increase an accuracy of detecting an abnormality of a manufacturing facility using a learning model to which an LSTM and an autoencoder are applied.

The method according to example embodiments may be embodied as a program that is executable by a computer and may be implemented as various recording media such as a magnetic storage medium, an optical reading medium, and a digital storage medium.

Various techniques described herein may be implemented as digital electronic circuitry, or as computer hardware, firmware, software, or combinations thereof. The techniques may be implemented as a computer program product, i.e., a computer program tangibly embodied in an information carrier, e.g., in a machine-readable storage device (for example, a computer-readable medium) or in a propagated signal for processing by, or to control an operation of a data processing apparatus, e.g., a programmable processor, a computer, or multiple computers. A computer program(s) may be written in any form of a programming language, including compiled or interpreted languages and may be deployed in any form including a stand-alone program or a module, a component, a subroutine, or other units suitable for use in a computing environment. A computer program may be deployed to be executed on one computer or on multiple computers at one site or distributed across multiple sites and interconnected by a communication network.

Processors suitable for execution of a computer program include, by way of example, both general and special purpose microprocessors, and any one or more processors of any kind of digital computer. Generally, a processor will receive instructions and data from a read-only memory or a random access memory or both. Elements of a computer may include at least one processor to execute instructions and one or more memory devices to store instructions and data. Generally, a computer will also include or be coupled to receive data from, transfer data to, or perform both on one or more mass storage devices to store data, e.g., magnetic, magneto-optical disks, or optical disks. Examples of information carriers suitable for embodying computer program instructions and data include semiconductor memory devices, for example, magnetic media such as a hard disk, a floppy disk, and a magnetic tape, optical media such as a compact disk read only memory (CD-ROM), a digital video disk (DVD), etc. and magneto-optical media such as a floptical disk, and a read only memory (ROM), a random access memory (RAM), a flash memory, an erasable programmable ROM (EPROM), and an electrically erasable programmable ROM (EEPROM). A processor and a memory may be supplemented by, or integrated into, a special purpose logic circuit.

Also, non-transitory computer-readable media may be any available media that may be accessed by a computer and may include both computer storage media and transmission media.

The present specification includes details of a number of specific implements, but it should be understood that the details do not limit any invention or what is claimable in the specification but rather describe features of the specific example embodiment. Features described in the specification in the context of individual example embodiments may be implemented as a combination in a single example embodiment. In contrast, various features described in the specification in the context of a single example embodiment may be implemented in multiple example embodiments individually or in an appropriate sub-combination. Furthermore, the features may operate in a specific combination and may be initially described as claimed in the combination, but one or more features may be excluded from the claimed combination in some cases, and the claimed combination may be changed into a sub-combination or a modification of a sub-combination.

Similarly, even though operations are described in a specific order on the drawings, it should not be understood as the operations needing to be performed in the specific order or in sequence to obtain desired results or as all the operations needing to be performed. In a specific case, multitasking and parallel processing may be advantageous. In addition, it should not be understood as requiring a separation of various apparatus components in the above described example embodiments in all example embodiments, and it should be understood that the above-described program components and apparatuses may be incorporated into a single software product or may be packaged in multiple software products.

It should be understood that the example embodiments disclosed herein are merely illustrative and are not intended to limit the scope of the invention. It will be apparent to one of ordinary skill in the art that various modifications of the example embodiments may be made without departing from the spirit and scope of the claims and their equivalents.

What is claimed is:

1. A computer program product embodied on a non-transitory computer-readable medium, the computer program product comprising software code portions being configured, when run on a processor, to perform a method of a learning model generating for detecting an abnormality of a manufacturing facility, the method comprising:
    receiving, via the processor connected to a multi-sensor, a measured value for a normal state of a manufacturing facility collected through the multi-sensor on a time-by-time basis;
    generating, via the processor, a learning model including a predetermined weight set and training the learning model using the measured value;
    determining, via the processor, using the learning model, a threshold corresponding to a boundary between the normal state and an abnormal state of the manufacturing facility and a criterion for determining the abnormal state in a local window representing a predetermined time interval; and
    removing a direction component of the received measured value to use the measured value for training of the learning model.

2. The learning model generating method of claim 1, wherein the training of the learning model comprises:
    calculating a measured value of a predetermined time t along with a weight set of the learning model and training the learning model by applying a portion of a result of the calculating to a calculation of the weight set and a measured value at t+1.

3. The learning model generating method of claim 1, wherein the training of the learning model comprises:
    updating the weight set such that an output value through the learning model is a same as the measured value.

4. A computer program product embodied on a non-transitory computer-readable medium, the computer program product comprising software code portions being configured, when run on a processor, to perform a method of detecting an abnormality of a manufacturing facility, the method comprising:
    receiving, via the processor connected to a multi-sensor, a measured value for a current state of a manufacturing facility measured through multi-sensor on a time-by-time basis;
    acquiring, via the processor, an output value for each time by inputting the measured value to a learning model for manufacturing facility abnormality detection;
    determining, via the processor, whether a proportion of an output value exceeding a threshold of the learning model satisfies a determination criterion of the learning model by comparing the output values to the threshold during a local window of the learning model;
    determining, via the processor, that the manufacturing facility is abnormal when the determination criterion is not satisfied; and
    switching, via the processor, when the manufacturing facility is determined to be abnormal, a control mode of the manufacturing facility to a server control mode controlled by a server or an Internet of things (IoT) terminal control mode controlled by an IoT terminal that performs a manufacturing facility abnormal detection method based on predetermined control mode setting information.

5. The method of claim 4, wherein the determining of whether the proportion satisfies the determination criterion comprises:
    determining whether the determination criterion of the learning model is satisfied based on a relationship between output values exceeding the threshold during the local window of the learning model.

6. The method of claim 4, further comprising:
    determining, when the manufacturing facility is determined to be abnormal, a cause of an occurrence of an abnormality in the manufacturing facility through a comparison between the measured value and the threshold and recording information on the cause.

7. The method of claim 4, further comprising:
reporting a current state of the manufacturing facility to an operator of the manufacturing facility when the manufacturing facility is determined to be abnormal.

8. The method of claim 4, further comprising:
evaluating an accuracy of the learning model and updating a weight set of the learning model when the manufacturing facility is determined to be abnormal.

9. A manufacturing facility abnormality detection apparatus comprising:
a processor connected to a multi-sensor;
wherein the processor is configured to receive a measured value for a current state of a manufacturing facility measured through the multi-sensor on a time-by-time basis, acquire an output value for each time by inputting the measured value to a learning model for manufacturing facility abnormality detection, determine whether a proportion of an output value exceeding a threshold of the learning model satisfies a determination criterion of the learning model by comparing the output values to the threshold during a local window of the learning model, and determine that the manufacturing facility is abnormal when the determination criterion is not satisfied, and
wherein when the manufacturing facility is determined to be abnormal, the processor is configured to switch a control mode of the manufacturing facility to a server control mode controlled by a server or an Internet of things (IoT) terminal control mode controlled by an IoT terminal that performs a manufacturing facility abnormal detection method, based on predetermined control mode setting information.

10. The manufacturing facility abnormality detection apparatus of claim 9, wherein the processor is configured to determine whether the determination criterion of the learning model is satisfied based on a relationship between output values exceeding the threshold during the local window of the learning model.

11. The manufacturing facility abnormality detection apparatus of claim 9, wherein when the manufacturing facility is determined to be abnormal, the processor is configured to determine a cause of an occurrence of an abnormality in the manufacturing facility through a comparison between the measured value and the threshold and record information on the cause.

12. The manufacturing facility abnormality detection apparatus of claim 9, wherein when the manufacturing facility is determined to be abnormal, the processor is configured to report a current state of the manufacturing facility to an operator of the manufacturing facility.

13. The manufacturing facility abnormality detection apparatus of claim 9, wherein when the manufacturing facility is determined to be abnormal, the processor is configured to evaluate an accuracy of the learning model and update a weight set of the learning model.

* * * * *